US012174983B2

(12) United States Patent
Runzo et al.

(10) Patent No.: US 12,174,983 B2
(45) Date of Patent: Dec. 24, 2024

(54) SYSTEM AND METHOD FOR MANAGING MATERIAL NON-PUBLIC INFORMATION FOR FINANCIAL INDUSTRY (71) Applicant: Equisolve, Inc., Palm City, FL (US)

(72) Inventors: Thomas Runzo, Palm City, FL (US); Eric Mason, Palm City, FL (US)

(73) Assignee: Equisolve, Inc., Palm City, FL (US)

( * ) Notice: Subject to any disclaimer, the term of this patent is extended or adjusted under 35 U.S.C. 154(b) by 335 days.

(21) Appl. No.: 17/675,735

(22) Filed: Feb. 18, 2022

(65) Prior Publication Data
US 2023/0267222 A1 Aug. 24, 2023

(51) Int. Cl.
G06F 21/62 (2013.01)
G06F 16/958 (2019.01)

(52) U.S. Cl.
CPC ........ G06F 21/6218 (2013.01); G06F 16/958 (2019.01); G06F 2221/2141 (2013.01)

(58) Field of Classification Search
None
See application file for complete search history.

(56) References Cited

U.S. PATENT DOCUMENTS

| 6,711,575 | B1* | 3/2004 | Applewhite | .......... G06F 16/275 |
| | | | | 707/999.102 |
| 7,069,245 | B2 | 6/2006 | Messick et al. | |
| 8,769,304 | B2 | 7/2014 | Kirsch | |
| 8,856,869 | B1* | 10/2014 | Brinskelle | ........... H04L 63/0823 |
| | | | | 726/2 |
| 9,171,289 | B2 | 10/2015 | Kraft et al. | |
| 9,852,127 | B2 | 12/2017 | Dettinger et al. | |
| 11,443,052 | B2* | 9/2022 | Lazar | ....................... G06F 21/31 |
| 2007/0233508 | A1 | 10/2007 | Gillespie | |
| 2008/0010365 | A1 | 1/2008 | Schneider | |
| 2012/0316888 | A1* | 12/2012 | Stacey | ................... G06Q 10/10 |
| | | | | 705/1.1 |
| 2013/0054721 | A1* | 2/2013 | Caden | ..................... H04L 43/10 |
| | | | | 709/206 |

(Continued)

OTHER PUBLICATIONS

Runzo et al; Are You Prepared for a SEC IR Website Compliance Review?; Mar. 3, 2017; retrieved on Mar. 12, 2024 from https://www.equisolve.com/insights/detail/37216/ir-website-compliance (Year: 2017).*

Primary Examiner — James R Turchen
(74) Attorney, Agent, or Firm — Mark Terry (57) ABSTRACT A system for managing and publishing material non-public information (MNPI) over a communications network includes a database including a restricted area configured for storing MNPI documents, the restricted area located on an overlay network that requires special credentials to access, a web server for receiving the plurality of MNPI documents over the communications network, encrypting MNPI documents and storing the MNPI documents that were encrypted in the restricted area, at a predetermined time, unencrypting the MNPI documents and storing the MNPI documents that were unencrypted in an area of the database that is not restricted, generating and publishing a web page that is publicly available over the communications network, wherein the web page includes a separate link to each MNPI document that was unencrypted and wherein the web page is located on a web site of a company.

12 Claims, 5 Drawing Sheets (56) References Cited

U.S. PATENT DOCUMENTS

| | | | |
|---|---|---|---|
| 2013/0325978 A1* | 12/2013 | Mansfield | G08B 21/24 |
| | | | 709/206 |
| 2017/0186123 A1 | 6/2017 | Shelton | |
| 2017/0255887 A1* | 9/2017 | DeLay | H04L 63/10 |
| 2018/0075157 A1* | 3/2018 | Narayan | G06F 16/23 |
| 2018/0081866 A1* | 3/2018 | DiTomaso | G06F 40/117 |
| 2019/0109713 A1* | 4/2019 | Clark | G06F 16/182 |
| 2019/0394511 A1* | 12/2019 | Kalaboukis | H04N 21/25891 |
| 2020/0065857 A1* | 2/2020 | Lagi | G06Q 30/0254 |
| 2021/0406771 A1* | 12/2021 | Basak | G06F 40/205 |
| 2023/0317261 A1* | 10/2023 | Vanggaard | G16H 70/20 |
| | | | 705/2 |

\* cited by examiner

SYSTEM AND METHOD FOR MANAGING MATERIAL NON-PUBLIC INFORMATION FOR FINANCIAL INDUSTRY

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The claimed subject matter relates to the field of financial technology and, more specifically, the claimed subject matter relates to the field of managing material non-public information for the financial industry.

BACKGROUND

The Securities and Exchange Commission (SEC) requires public companies, certain company insiders, and broker-dealers to file periodic financial statements and other disclosures, which are often referred to as SEC filings, SEC filing documents or regulatory documents. Finance professionals and investors rely on SEC filings to make informed decisions when evaluating whether to invest in a company. SEC filings can be accessed for free on the SEC's online database, referred to as its Electronic Data Gathering, Analysis, and Retrieval system, otherwise known as EDGAR. The SEC selectively reviews the information it receives to monitor and enhance compliance. Investors study SEC filings to form a view of a company's performance and activities.

Material nonpublic information (or MNPI). MNPI is data relating to a company that has not been made public but could have an impact on its share price. It is against the law for holders of MNPI to use the information to their advantage in trading stocks. It is also illegal to share MNPI with others who use it to profit in the market. One of the problems of the existing systems is managing MNPI in such a way that it is disclosed to the public all at once, and that said MNPI is not available to others before a predefined publication date and time.

Existing systems do not do an adequate job of protecting MNPI documents. This is disadvantageous as it compromises the financial system and makes it vulnerable to those who seek to exploit this failure. The lack of appropriate protection of MNPI documents before publication in the financial sector further disenfranchises a large segment of the population from participating in investment activities, which has long-ranging implications. This is further problematic because regulations require that publicly traded companies take certain precautions to protect MNPI documents before publication.

Therefore, what is needed is a system and method for improving the problems with the prior art, and more particularly for a more expedient and efficient method and system for facilitating the management of MNPI for the financial industry.

SUMMARY

In one embodiment, a system for managing and publishing material non-public information (MNPI) over a communications network is disclosed. The system includes a database communicably connected to the communications network, the database configured for storing a plurality of MNPI documents associated with a particular company; a restricted area of the database configured for storing MNPI documents, the restricted area located on an overlay network that requires special credentials to access; a web server communicably connected to the communications network, the web server configured for: receiving the plurality of MNPI documents over the communications network; encrypting the plurality of MNPI documents and storing the plurality of MNPI documents that were encrypted in the restricted area; at a predetermined time, unencrypting the plurality of MNPI documents and storing the plurality of MNPI documents that were unencrypted in an area of the database that is not restricted, generating and publishing a web page that is publicly available over the communications network, wherein the web page includes a separate link to each of said plurality of MNPI documents that were unencrypted and wherein the web page is located on a web site of the particular company.

Additional aspects of the claimed subject matter will be set forth in part in the description which follows, and in part will be obvious from the description, or may be learned by practice of the claimed subject matter. The aspects of the claimed subject matter will be realized and attained by means of the elements and combinations particularly pointed out in the appended claims. It is to be understood that both the foregoing general description and the following detailed description are exemplary and explanatory only and are not restrictive of the disclosed subject matter, as claimed.

BRIEF DESCRIPTION OF THE DRAWINGS

The accompanying drawings, which are incorporated in and constitute part of this specification, illustrate embodiments of the claimed subject matter and together with the description, serve to explain the principles of the claimed subject matter. The embodiments illustrated herein are presently preferred, it being understood, however, that the claimed subject matter is not limited to the precise arrangements and instrumentalities shown, wherein:

DETAILED DESCRIPTION OF THE DRAWINGS

The disclosed embodiments improve upon the problems with the prior art by providing a system that allows for the quick and easy management, uploading, storing, and publishing of accessible Material Non-Public Information (MNPI) without allowing said MNPI to become compromised or publicly available before a desired publication date and time. The claimed embodiments are configured for the protected uploading of MNPI documents to a restricted access area that is not accessible to the Internet, and for protecting the MNPI documents from administrator and other users of the very host where the MNPI is located. Therefore, the disclosed embodiments reduce or eliminate instances where users are able to view important financial documents before a desired publication date and time. This is advantageous for the financial industry, as it protects trading markets and financial activities and encourages fairness. An additional benefit of the disclosed embodiments is the immediate publication, at a predefined date and time, of material financial information in a way that reduces the need for human interaction in the publication process. The main benefit of the claimed subject matter is the improvement of the conventional process of publishing financial information in a secure way. The claimed subject matter further allows for the automation of the process of producing published financial documents, thereby resulting in time savings.

Figure 1:
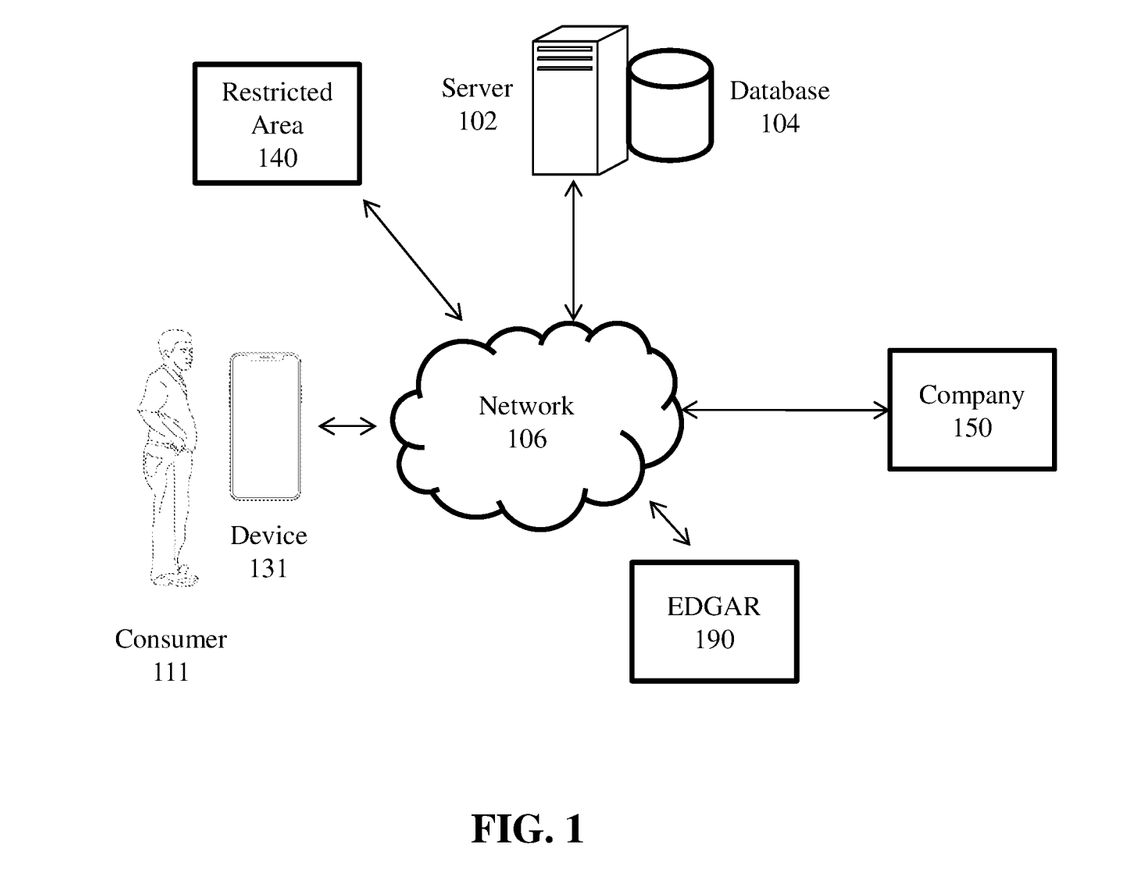
FIG. 1 is a block diagram illustrating the network architecture of a system for facilitating the management of MNPI over a communications network, in accordance with one embodiment.

Referring now to the drawing figures in which like reference designators refer to like elements, there is shown in FIG. 1 an illustration of a block diagram showing the network architecture of a system 100 and method for facilitating the management of MNPI a communications network in accordance with one embodiment. A prominent element of FIG. 1 is the server 102 associated with repository or database 104 and further communicatively coupled with network 106, which can be a circuit-switched network, such as the Public Service Telephone Network (PSTN), or a packet-switched network, such as the Internet or the World Wide Web, the global telephone network, a cellular network, a mobile communications network, or any combination of the above. Server 102 is a central controller or operator for the functionality of the disclosed embodiments, namely, facilitating the management of MNPI.

FIG. 1 includes computing devices 131, 140, 150, 190, which may be mobile computing devices such as smartphones, mobile phones, tablet computers, handheld computers, laptops, or the like. In another embodiment, computing devices 131, 140, 150, 190 may be stationary devices such as workstations, desktop computers, servers, laptops, all-in-one computers, or the like. In another embodiment, computing devices 131, 140, 150, 190, are AR or VR systems that may include display screens, headsets, heads-up displays, helmet-mounted display screens, or the like. Mobile computing device 131 corresponds to a consumer 111 of financial documents. Computing device 190 corresponds to the Securities and Exchange Commission's (SEC's) free online database, referred to as its Electronic Data Gathering, Analysis, and Retrieval system, otherwise known as EDGAR. Device 190 may also be a site, a collection of servers, or the like. Computing device 150 corresponds to a publicly-traded company or any company that is subject to financial regulations that require accessible documents to consumers. Device 150 may also be a site, a collection of servers or the like. Computing device 140 is described more fully below. Devices 131, 140, 150, 190 may be communicatively coupled with network 106 in a wired or wireless fashion.

FIG. 1 further shows that server 102 includes a database or repository 104, which may be a relational database comprising a Structured Query Language (SQL) database stored in a SQL server. Devices 131, 140, 150, 190 may also each include their own database. The repository 104 serves data from a database, which is a repository for data used by server 102 and devices 131, 140, 150, 190 during the course of operation of the disclosed embodiments. Database 104 may be distributed over one or more nodes or locations that are connected via network 106.

In one embodiment, device 140 may be a site, a collection of servers, or the like. Specifically, in one embodiment, device 140 may be an overlay network which is a computer network that is layered on top of another network and is supported by its infrastructure. An overlay network decouples network services from the underlying infrastructure by encapsulating one packet inside of another packet. For this reason, accessing the overlay network may require special permissions, credentials, and specific software. Additionally, single-factor authentication or multi-factor authentication may be utilized to access the overlay network. Note that authentication only applies to the user or users that allowed to have access to the MNPI documents and does not apply to users that are not allowed to have access to the MNPI documents, even users or administrators of the very host on which the MNPI documents are located. In light of the above, device 140 is referred to as a restricted access area. Nodes in the overlay network are connected by virtual or logical links, each of which corresponds to a path through many physical links, in the underlying network. The Internet may be the basis for the overlay network, which may be constructed to permit the routing of messages to destinations not specified by an IP address. Distributed hash tables can be used to route messages to a node having a specific logical address, whose IP address is not known in advance. In one embodiment, device 140 is a section or area of database 104. In a different embodiment, device 140 is not a restricted access area as special permissions and credentials are not required.

The database 104 may include a user record for each user 111. A user record may include: contact/identifying information for the user (IP address, cookies, name, address, telephone number(s), email address, etc.), information pertaining to documents associated with the user, information pertaining to the documents viewed by the user, etc. A user record may also include a unique identifier for each user, the current location of each user (based on location-based services from the user's mobile computer) and a description of each user's desired settings. A user record may further include demographic data for each user, such as age, sex, income data, race, color, marital status, etc.

The database 104 may include a company record for each company 150. A company record may include: contact/identifying information for the company (name, address, telephone number(s), email address, website, etc.), the company ticker symbol, information pertaining to documents associated with the company, etc. A company record may also include a unique identifier for each company and a description of past documents issued by said company.

The database 104 may include a record for each document. A document comprises a collection of information that is stored in electronic form in a particular format on a storage device. In one embodiment, database 104 is used to hold SEC filing documents or regulatory documents, among other things. Examples of documents referred to as SEC filings are a registrations statement, form 10-K, form 10-Q, form 8-K, proxy statement, forms 3, 4, and 5, schedule 13D, form 144, and foreign investment disclosures.

A registration statement provides information about the securities being offered by a company as well as its financial condition. A Form 10-K is an annual report that provides a comprehensive analysis of the company's financial condition. A form 10-Q is a truncated version of a Form 10-K that is filed quarterly. The form provides a view of the company's ongoing financial condition throughout the year. A Form 8-K is what a company uses to disclose major developments that occur between filings of the Form 10-K or form 10-Q. Major company events that would necessitate the filing of a Form 8-K include bankruptcies or receiverships, material impairments, completion of acquisition or disposition of assets, or departures or appointments of executives. A proxy statement discloses the salaries of the management of a company and any other perks that a company's management is eligible for. The proxy statement is presented prior to the shareholder meeting and must be filed with the SEC before soliciting a shareholder vote on the election of directors and approval of other corporate actions. Forms 3, 4, and 5 disclose ownership amounts of company directors and officers, changes in ownership, and an annual summary. Schedule 13D is a beneficial ownership report and is required when any owner acquires 5% or more of the voting shares in a company. Form 144 is required when corporate insiders want to dispose of company stock. Form 144 is a notice of the intent to sell restricted stock, typically acquired by insiders or affiliates in a transaction not involving a public offering. Foreign investment disclosures apply to foreign companies offering securities in the U.S. market.

Said record for each document may include permissions. Document-level permissions are used to manage access to various pieces of content based on a user's or team's attributes. A user or team may be allowed or denied access to certain documents. Tied with the concept of document permissions is the concept of material nonpublic information (or MNPI). MNPI is data relating to a company (such as company 150) that has not been made public but could have an impact on its share price. It is against the law for holders of MNPI to use the information to their advantage in trading stocks. It is also illegal to share MNPI with others who use it to profit in the market. One of the objects of the claimed subject matter is the ability to manage MNPI in such a way that it is disclosed to the public all at once, and that said MNPI is not available to others before a predefined publication date and time.

FIG. 1 shows an embodiment wherein networked computing devices 131, 140, 150, 190 interact with server 102 and repository 104 over the network 106. It should be noted that although FIG. 1 shows only the networked computers 131, 140, 150, 190, the system of the disclosed embodiments supports any number of networked computing devices connected via network 106. Further, server 102, and units 131, 140, 150, 190 include program logic such as computer programs, mobile applications, executable files or computer instructions (including computer source code, scripting language code or interpreted language code that may be compiled to produce an executable file or that may be interpreted at run-time) that perform various functions of the disclosed embodiments.

Note that although server 102 is shown as a single and independent entity, in one embodiment, the functions of server 102 may be integrated with another entity, such as one of the devices 131, 140, 150, 190. Further, server 102 and its functionality, according to a preferred embodiment, can be realized in a centralized fashion in one computer system or in a distributed fashion wherein different elements are spread across several interconnected computer systems.

Figure 2:
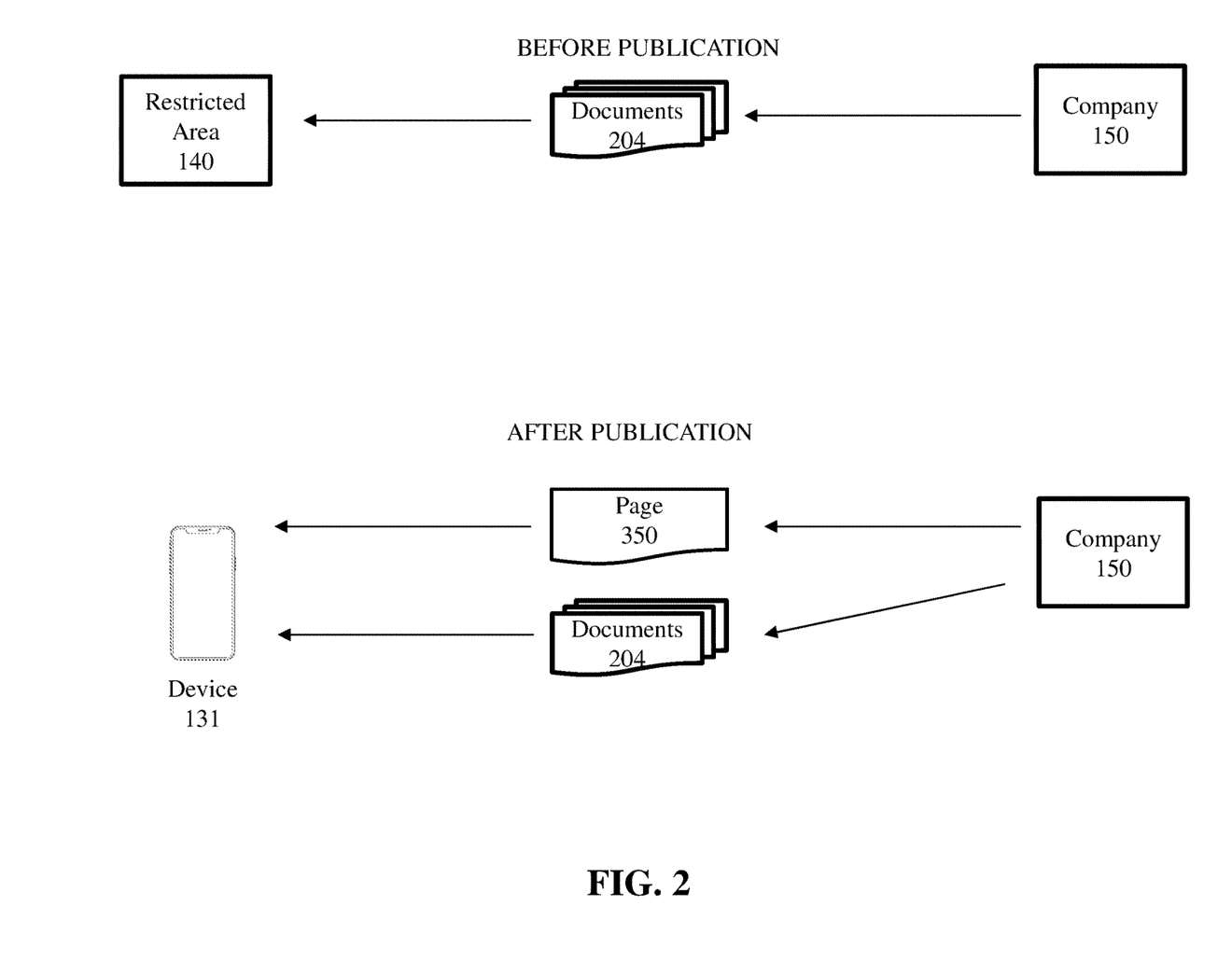
FIG. 2 is a block diagram showing the data flow of the process for facilitating the management of MNPI over a communications network, according to one embodiment.
Figure 3A:
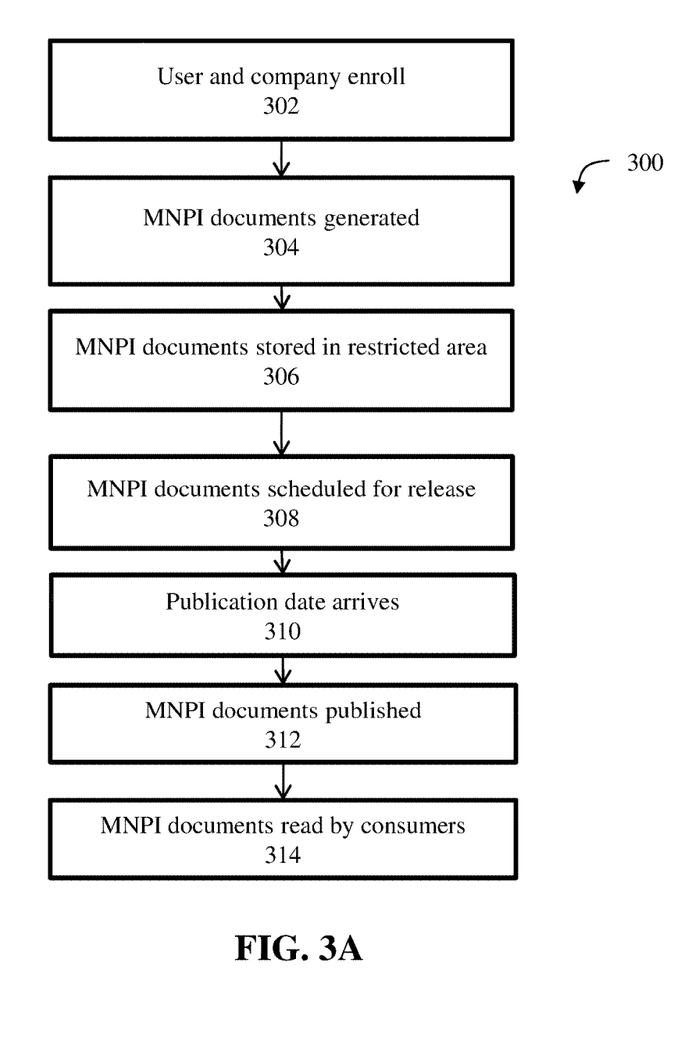
FIG. 3A is a flow chart depicting the general control flow of a process for facilitating the management of MNPI over a communications network, according to one embodiment.
Figure 3B:
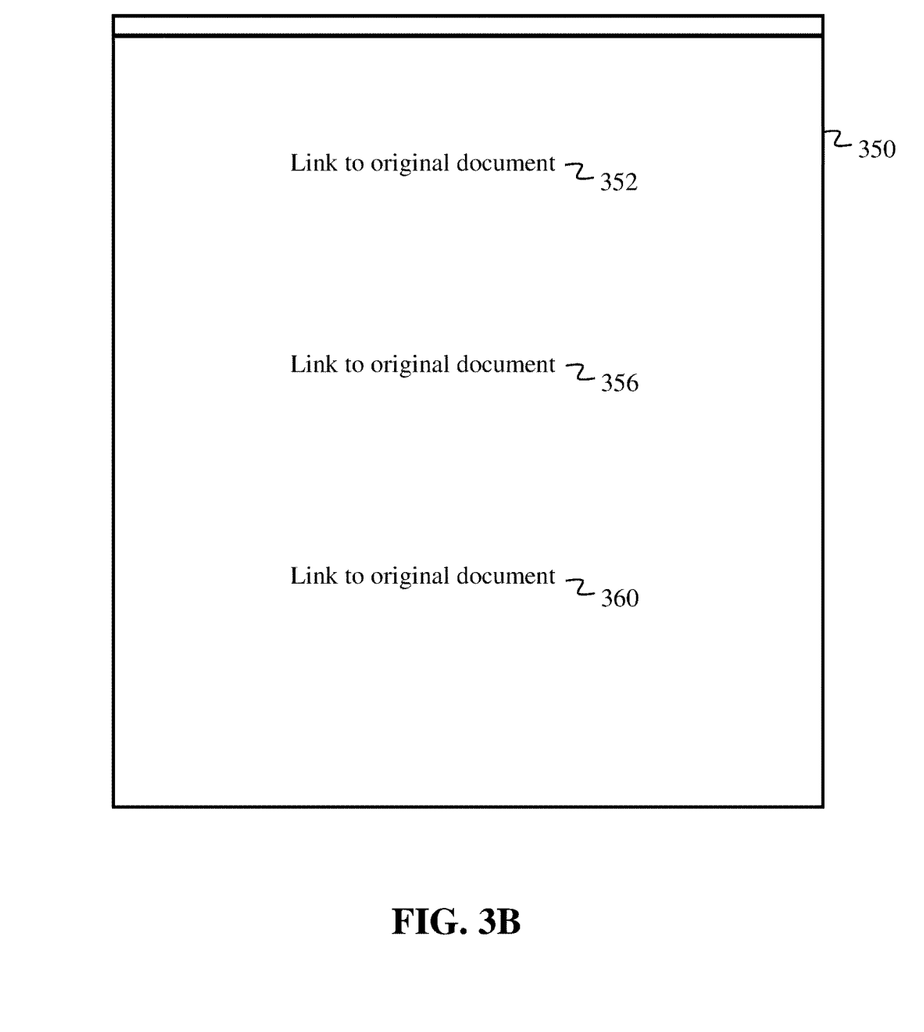
FIG. 3B is a block diagram showing a web page generated during the process for facilitating the management of MNPI over a communications network, according to one embodiment.

The process of facilitating the management of MNPI over a communications network will now be described with reference to FIGS. 2-3B below. FIGS. 2-3B depict the data flow and control flow of the process for facilitating the management of MNPI over a communications network 106, according to one embodiment. The process of the disclosed embodiments begins with optional step 302 (see flowchart 300), wherein the consumer 111 and company 150 may enroll or register with server 102. In the course of enrolling or registering, the users may enter data into their device by manually entering data into an application, a web browser, or a mobile application via keypad, touchpad, or voice. In the course of enrolling or registering, the user and/or company may enter any data that may be stored in a user record or a company record, as defined above. Also in the course of enrolling or registering, the server 102 may generate a user record for each registering user and store the user record in an attached database, such as database 104, and server 102 may generate a company record for each registering company and store the company record.

Subsequently, in step 304, the company 150 generates its MNPI documents 204 in-house. In one embodiment, said MNPI documents 204 comprise a plurality of documents.

In step 306, the company 150 uploads or transmits the encrypted MNPI documents 204 to the restricted area 140. In one embodiment, said MNPI documents 202 comprise a plurality of documents. In one embodiment, uploading the MNPI documents to the restricted area requires authentication, special permissions, credentials, and software. In another embodiment, the documents are uploaded to the restricted area 140. In one embodiment, uploading the MNPI documents to the restricted area requires server 102 to receive said documents, and server 102 encrypts the MNPI documents 204 and stores said documents in the restricted area 140. Said documents received from the server are associated with a particular company 150. Document encryption is the process by which documents are protected with cryptographic keys (a password, public key, token, etc.) so that only individuals with the corresponding decryption keys (the same password, private key, token, etc.) can open them. It is used to protect documents in transit (i.e., sent via network 106) and at rest (i.e., stored on a disk or in the cloud) from being accessed by unauthorized users.

Authentication is the process of identifying a user who requests access to a system, network, or device. Credentials offer proof of a fact or of qualifications—an example of credentials includes a username and password authentication token that is bound to a particular user. Two-factor authentication is an electronic authentication method in which a user is granted access to a system, network, or device only after successfully presenting two or more pieces of evidence or factors—such as a password, as well as a code sent by text to the user's phone.

Subsequently, in step 308, the MNPI documents are scheduled for release, which may comprise defining a predetermined time and date of publication of MNPI. Then, the predetermined time and date of publication of MNPI arrives in step 310.

In step 312, server 102 unencrypts the MNPI documents 204, stores the MNPI documents 204 that were unencrypted in an area of the database 104 that is not restricted, makes the MNPI documents 204 public and the publishing entity (which may be server 102) publishes the MNPI documents 204. The MNPI documents 204 may be published by providing a link on a website of company 150 that references the location (via a URL) of the MNPI documents 204 uploaded to restricted area 140 in step 310. In another embodiment, the MNPI documents 204 may be published by uploading the full documents on the website of company 150 such that they are directly downloadable from said company website. The publishing entity may be server 102, company 150, or another entity acting on behalf of company 150, such as a website hosting entity or a third-party content management system. The area of database 104 that is not restricted may be an area that is not on an overlay network, an area that is Internet-accessible and an area that does not require any special permissions or special software to access. Also, in step 312, the restricted access area 140 is configured to remove restricted access, such that the data stored in the restricted access area 140 is freely available via the Internet without any necessary permissions or special software.

The publishing of documents (step 312 above) may encompass server 102 generating a web page 350 (see FIG. 3B) that provides a series of links for viewing the MNPI documents 204. In said page 350, a link is provided for viewing each document. In this embodiment, the link is hypertext link and/or a universal resource locator (URL), and the link is clickable and readable in the viewing area of a web browser or document viewer, such as a portable document format viewer. In one embodiment, the publishing of documents (step 312 above) operates as follows. Server 102 iterates through the MNPI documents 204, and for each particular document, server 102 writes a link to a said particular document on the web page 350 (such as links 352, 356, 360). In one embodiment, the process of publishing any information on the website of company 150 encompasses the acts of logging on to a website hosting server (which may be operated by a third-party hosting entity) using credentials provided by the company and uploading relevant information (such as web pages, code and other software) to said web site hosting server. In one embodiment, the process of publishing any information on the website of company 150 encompasses the acts of publishing said information on the website of the company with which the MNPI document 204 of step 306 was associated.

In step 314, consumer 111 utilizes the computing device 131 to access web page 350, including the MNPI documents 204.

In one alternative to step 312, in lieu of waiting for a predetermined time and date of publication to arrive, server 102 detects that a particular press release has been published over the communications network 106. This entails the execution of a program that is constantly monitoring specific locations of network 106 and running a pattern recognition program to detect the publication of certain text that matches the press release that is being searched. Once detected, step 312 is executed. In another alternative to step 312, in lieu of waiting for a predetermined time and date of publication to arrive, server 102 detects that a particular regulatory document has been published over the communications network 106. This entails the execution of a program that is constantly monitoring specific locations of network 106 and running a pattern recognition program to detect the publication of certain text that matches the regulatory document that is being searched. Once detected, step 312 is executed.

Figure 4:
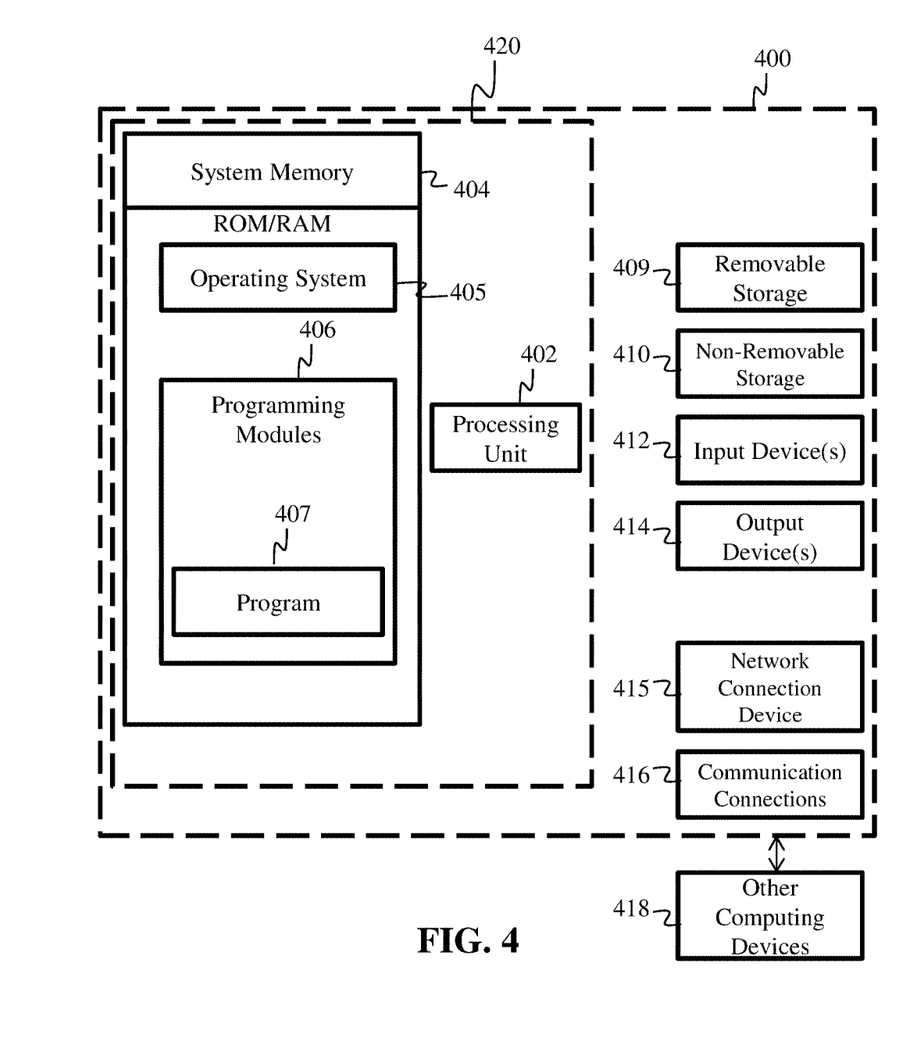
FIG. 4 is a block diagram depicting a system including an example computing device and other computing devices.

FIG. 4 is a block diagram of a system including an example computing device 400 and other computing devices. Consistent with the embodiments described herein, the aforementioned actions performed by 102, 131, 140, 150, 190 may be implemented in a computing device, such as the computing device 400 of FIG. 4. Any suitable combination of hardware, software, or firmware may be used to implement the computing device 400. The aforementioned system, device, and processors are examples, and other systems, devices, and processors may comprise the aforementioned computing device. Furthermore, computing device 400 may comprise an operating environment for system 100 and process 300, as described above. Process 300 may operate in other environments and is not limited to computing device 400.

With reference to FIG. 4, a system consistent with an embodiment may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random-access memory (RAM)), non-volatile (e.g. read-only memory (ROM)), flash memory, or any combination or memory. System memory 404 may include operating system 405, and one or more programming modules 406. Operating system 405, for example, may be suitable for controlling computing device 400's operation. In one embodiment, programming module 406 may include, for example, a program module 407 for executing the actions of 131, 140, 150, 190, 102. Furthermore, embodiments may be practiced in conjunction with a graphics library, other operating systems, or any other application program and are not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer-readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. Computing device 400 may also include a vibration device capable of initiating a vibration in the device on command, such as a mechanical vibrator or a vibrating alert motor. The aforementioned devices are only examples, and other devices may be added or substituted.

Computing device 400 may also contain a network connection device 415 that may allow device 400 to communicate with other computing devices 418, such as over a network in a distributed computing environment, for example, an intranet or the Internet. Device 415 may be a wired or wireless network interface controller, a network interface card, a network interface device, a network adapter or a LAN adapter. Device 415 allows for a communication connection 416 for communicating with other computing devices 418. Communication connection 416 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both computer storage media and communication media.

As stated above, a number of program modules and data files may be stored in system memory 404, including operating system 405. While executing on processing unit 402, programming modules 406 (e.g. program module 407) may perform processes including, for example, one or more of the stages of process 300 as described above. The aforementioned processes are examples, and processing unit 402 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for managing and publishing material non-public information (MNPI) over a communications network, the system comprising:
  a database communicably connected to the communications network, the database comprising a processor and a memory, wherein the database is configured for storing a plurality of MNPI documents associated with a particular company;
  a restricted area of the database configured for storing MNPI documents, the restricted area located on an overlay network that requires special credentials to access;
  a web server communicably connected to the communications network, the web server comprising a processor and a memory, wherein the web server is configured for:
    receiving the plurality of MNPI documents over the communications network;
    encrypting the plurality of MNPI documents and storing the plurality of MNPI documents that were encrypted in the restricted area;
    at a predetermined time, unencrypting the plurality of MNPI documents and storing the plurality of MNPI documents that were unencrypted in an area of the database that is not restricted, generating and publishing a web page that is publicly available over the communications network, wherein the web page includes a separate link to each of said plurality of MNPI documents that were unencrypted, and wherein the web page is located on a web site of the particular company.

2. The system of claim 1, wherein the restricted area further requires special software to access.

3. The system of claim 2, wherein a link comprises a hypertext link.

4. The system of claim 3, wherein a link comprises a uniform resource locator.

5. A system for managing and publishing material non-public information (MNPI) over a communications network, the system comprising:
  a database communicably connected to the communications network, the database comprising a processor and a memory, wherein the database is configured for storing a plurality of MNPI documents associated with a particular company;

a restricted area of the database configured for storing MNPI documents, the restricted area located on an overlay network that requires special credentials to access;

a web server communicably connected to the communications network, the web server comprising a processor and a memory, wherein the web server is configured for:

receiving the plurality of MNPI documents over the communications network;

encrypting the plurality of MNPI documents and storing the plurality of MNPI documents that were encrypted in the restricted area;

detecting that a particular press release has been published by executing a pattern recognition program that monitors predefined locations of the communications network for press releases that match predefined text;

responsive to detecting the particular press release, unencrypting the plurality of MNPI documents and storing the plurality of MNPI documents that were unencrypted in an area of the database that is not restricted, generating and publishing a web page that is publicly available over the communications network, wherein the web page includes a separate link to each of said plurality of MNPI documents that were unencrypted, and wherein the web page is located on a web site of the particular company.

6. The system of claim 5, wherein the restricted area further requires special software to access.

7. The system of claim 5, wherein a link comprises a hypertext link.

8. The system of claim 7, wherein a link comprises a uniform resource locator.

9. A system for managing and publishing material non-public information (MNPI) over a communications network, the system comprising:

a database communicably connected to the communications network, the database comprising a processor and a memory, wherein the database is configured for storing a plurality of MNPI documents associated with a particular company;

a restricted area of the database configured for storing MNPI documents, the restricted area located on an overlay network that requires special credentials to access;

a web server communicably connected to the communications network, the web server comprising a processor and a memory, wherein the web server is configured for:

receiving the plurality of MNPI documents over the communications network;

encrypting the plurality of MNPI documents and storing the plurality of MNPI documents that were encrypted in the restricted area;

detecting that a particular regulatory document has been published by executing a pattern recognition program that monitors predefined locations of the communications network for press releases that match predefined text;

responsive to detecting the particular regulatory document, unencrypting the plurality of MNPI documents and storing the plurality of MNPI documents that were unencrypted in an area of the database that is not restricted, generating and publishing a web page that is publicly available over the communications network, wherein the web page includes a separate link to each of said plurality of MNPI documents that were unencrypted, and wherein the web page is located on a web site of the particular company.

10. The system of claim 9, wherein the restricted area further requires special software to access.

11. The system of claim 10, wherein a link comprises a hypertext link.

12. The system of claim 11, wherein a link comprises a uniform resource locator.

\* \* \* \* \*